(12) United States Patent
Dueser et al.

(10) Patent No.: US 9,663,041 B2
(45) Date of Patent: May 30, 2017

(54) PASSENGER SEAT INCLUDING A HOLDING DEVICE FOR A MEDIA REPRODUCING APPARATUS

(71) Applicants: Lufthansa Systems GmbH & Co. KG, Raunheim (DE); Airbus Operations GmbH, Hamburg (DE)

(72) Inventors: Gerd Dueser, Hamburg (DE); Carsten Wolgast, Hamburg (DE); Lars Schomacker, Hamburg (DE); Thomas Felske, Hamburg (DE); Joerg Liebe, Wiesbaden (DE); Peter Hommel, Bad Homburg (DE); Heiko Waechter, Wiesbaden (DE); Mohamed Lakhloufi, Ruesselsheim (DE); Peter Miehlke, Schwaebisch Hall (DE); Jochen Schroeder, Schwaebisch Hall (DE); Erwin Ilias, Schwaebisch Hall (DE); Horst Pohlenz, Schwaebisch Gmuend (DE)

(73) Assignees: Lufthansa Systems GmbH & Co. KG, Raunheim (DE); Airbus Operations GmbH, Hamburg (DE)

( * ) Notice: Subject to any disclaimer, the term of this patent is extended or adjusted under 35 U.S.C. 154(b) by 91 days.

(21) Appl. No.: 14/743,019

(22) Filed: Jun. 18, 2015

(65) Prior Publication Data

US 2015/0367787 A1     Dec. 24, 2015

(30) Foreign Application Priority Data

Jun. 18, 2014   (DE) .................. 10 2014 211 766

(51) Int. Cl.
*A47C 7/72*     (2006.01)
*B60R 11/02*    (2006.01)
(Continued)

(52) U.S. Cl.
CPC ........ *B60R 11/0235* (2013.01); *B60N 2/4876* (2013.01); *A47C 7/72* (2013.01);
(Continued)

(58) Field of Classification Search
CPC ........ B60R 11/0235; B60R 2011/0017; B60N 2/4876; B60N 2/002; A47C 7/72
(Continued)

(56) References Cited

U.S. PATENT DOCUMENTS 5,264,765 A * 11/1993 Pecorino .................. H04N 5/65
                                                     160/23.1
5,640,297 A *  6/1997 Labaze .............. B64D 11/0015
                                                      160/127
(Continued)

FOREIGN PATENT DOCUMENTS

DE     102005058113 A1    6/2006
DE     202006009294 U1    8/2006
(Continued)

*Primary Examiner* — Syed A Islam
(74) *Attorney, Agent, or Firm* — The Webb Law Firm

(57) ABSTRACT

A passenger seat including a holding device for a media reproducing apparatus, includes a base holding fixture attached to a backrest of said passenger seat, at least one adapter adapted to be detachably connected with said base holding fixture, said adapter being configured for holding said media reproducing apparatus at said base holding fixture, a standardized electronic interface to the power supply of said media reproducing apparatus, and a protective shutter fixedly connected with said backrest. The protective shutter is adapted to be moved from an open position in which access to said adapter and said media reproducing apparatus is allowed, into a closed position in which said media reproducing apparatus and said adapter are completely covered by said protective shutter. The protective shutter is of break-proof configuration and made at least (Continued)

partially from a translucent material such that a screen is visible through said protective shutter in the closed position.

15 Claims, 3 Drawing Sheets

(51) Int. Cl.
  *B60N 2/48* (2006.01)
  *B60R 11/00* (2006.01)
(52) U.S. Cl.
  CPC ............... *B60R 2011/0015* (2013.01); *B60R 2011/0017* (2013.01); *B60R 2011/0085* (2013.01); *B60R 2011/0094* (2013.01)
(58) Field of Classification Search
  USPC ..................................................... 297/217.3
  See application file for complete search history.

(56) References Cited

U.S. PATENT DOCUMENTS

| | | | | |
|---|---|---|---|---|
| 6,003,052 A | * | 12/1999 | Yamagata | G06F 1/1626 345/905 |
| 6,292,236 B1 | * | 9/2001 | Rosen | B60R 11/0235 224/311 |
| 6,786,547 B1 | * | 9/2004 | Chu | B60N 2/4876 297/217.3 |
| 7,426,797 B2 | * | 9/2008 | Delaney | B43L 3/005 40/341 |
| 7,533,452 B1 | * | 5/2009 | Espina | B60N 2/4876 29/527.1 |
| 7,597,393 B1 | * | 10/2009 | Tuccinardi | B60R 11/0211 297/188.04 |
| 2005/0206206 A1 | * | 9/2005 | Peng | B60R 11/0235 297/217.3 |
| 2009/0174847 A1 | | 7/2009 | Kuno | |
| 2010/0007805 A1 | | 1/2010 | Vitito | |
| 2012/0248833 A1 | | 10/2012 | Hontz et al. | |
| 2015/0336673 A1 | * | 11/2015 | Hommel | B60R 11/0235 297/217.3 |
| 2016/0297526 A1 | * | 10/2016 | Everhart | B64D 11/00151 |

FOREIGN PATENT DOCUMENTS

| | | |
|---|---|---|
| DE | 102008063618 A1 | 9/2009 |
| DE | 102011082061 A1 | 3/2013 |
| JP | 2007145276 A | 6/2007 |
| WO | 2012138699 A1 | 10/2012 |
| WO | 2014001155 A1 | 1/2014 |

* cited by examiner

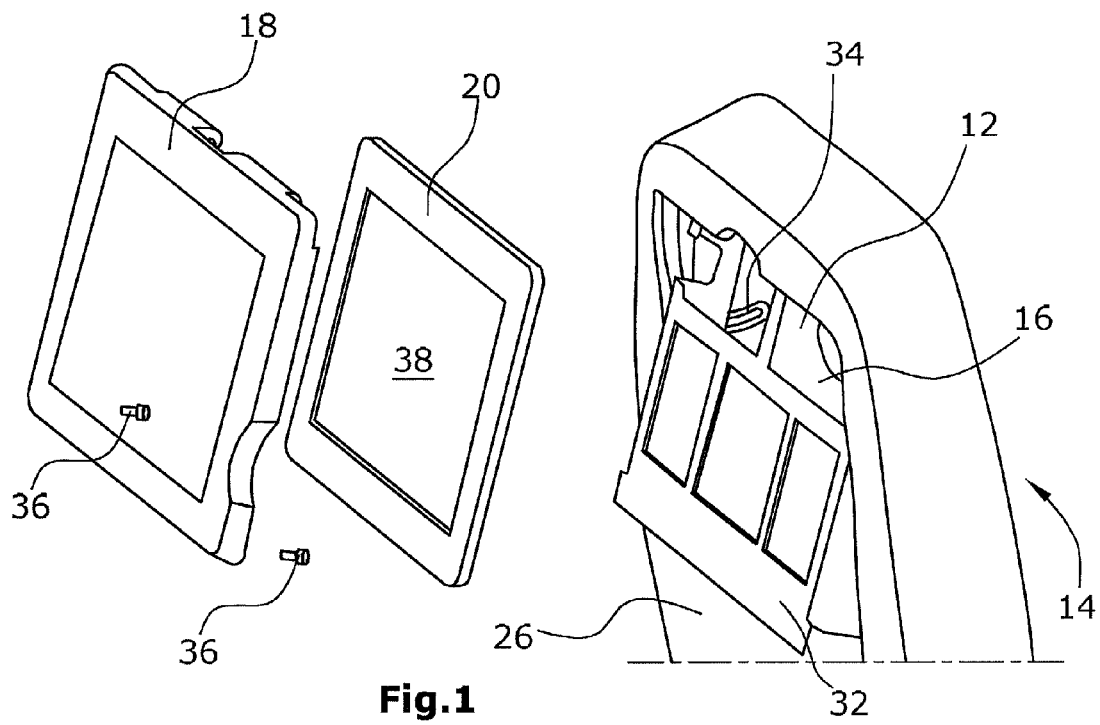
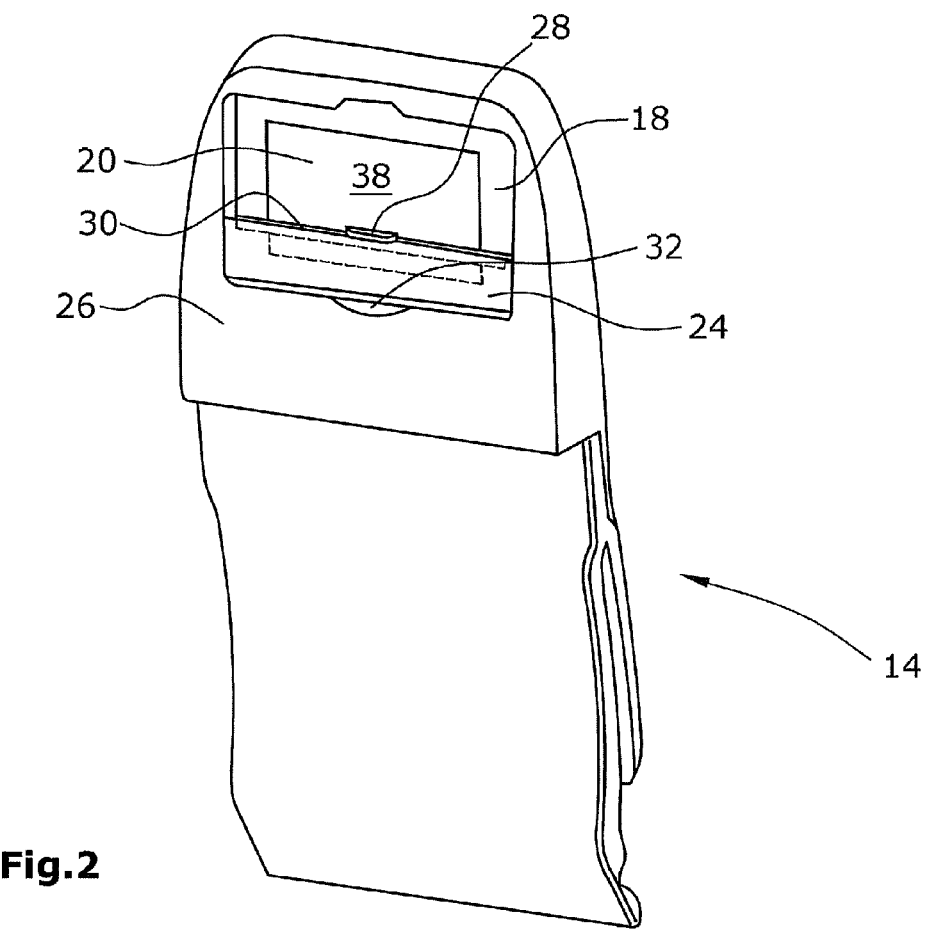
Fig.1
Fig.2

PASSENGER SEAT INCLUDING A HOLDING DEVICE FOR A MEDIA REPRODUCING APPARATUS

CROSS-REFERENCE TO RELATED APPLICATION

This application claims priority to German Patent Application No. 10 2014 211 766.6 filed Jun. 18, 2014, the disclosure of which is hereby incorporated in its entirety by reference.

BACKGROUND OF THE INVENTION

Field of the invention

The invention relates to a holding device for holding a media reproducing apparatus at a passenger seat in a transportation apparatus.

Description of Related Art

The transportation apparatus may be an aircraft, such as a passenger plane or a helicopter, a land craft, such as an overland bus, an automobile or a train or a ship. Such transportation apparatus are typically provided with a plurality of passenger seats arranged one behind the other. It is common practice to attach a media reproducing apparatus to the backrest of a front passenger seat for the passenger in the passenger seat located behind. The media reproducing apparatus is an electronic apparatus for reproducing video and/or audio contents. For this purpose, the media reproducing apparatus is provided with a screen. The media reproducing apparatus may be a tablet PC or a mobile phone (smart phone), for example.

In particular in airplanes it is common practice to provide media reproducing apparatus in the form of in-seat screens, which are connected with a central data server on which video films or music for reproduction via the media reproducing apparatus are stored. At that it should be allowed that a passenger-owned media reproducing apparatus or a media reproducing apparatus made available to the passenger for the time of the journey is attached to the passenger seat. This is however critical in that in most cases conventional media reproducing apparatus do not pass the safety-related approval procedure since in the case of an accident or an emergency landing the screen may be damaged by impinging objects thus posing a risk of injury to the passenger.

SUMMARY OF THE INVENTION

It is an object of the invention to provide an improved holding device for a media reproducing apparatus at a passenger seat.

According to the invention, the passenger seat is provided with a base holding fixture attached to the backrest, said holding fixture being adapted to be detachably connected with an adapter. The adapter, in turn, is configured for holding the media reproducing apparatus at the base holding fixture. The media reproducing apparatus may be clamped between the adapter and the base holding fixture, for example. Alternatively or additionally, the base holding fixture and/or the adapter may be provided with holding clamps or receptacles for the media reproducing apparatus. A decisive factor is that the base holding fixture is fixedly connected with the passenger seat, and the receptacle and the base holding fixture are provided with standardized matching fasteners. Thus different adapters can be connected with the same base holding fixture. The adapters may be adapted to the media reproducing apparatus for attaching different media reproducing apparatus to the base holding fixture.

According to the invention, a protective shutter of a break-proof material fixedly connected with the seat is provided, which is adapted to be moved from an open position into a closed position. The protective shutter configured as a sliding shutter is preferably adapted to be displaced between the open and the closed position. The open position allows for access to the media reproducing apparatus in order to operate or exchange the latter or to remove the adapter from the base holding fixture. In the closed position the adapter and the media reproducing apparatus are completely covered by the protective shutter. The protective shutter thus forms a protective barrier for preventing an object from impinging upon the media reproducing apparatus and breaking the latter. When the protective shutter is in its closed position, the passenger is protected from coming into contact with the media reproducing apparatus when he hits the backrest of the passenger seat in front of him.

According to the invention, a particular characteristic of the protective shutter is that it is at least partially translucent such that in the closed position of the protective shutter a screen of the media reproducing apparatus is visibly through the protective shutter. This offers the advantage that, for example during maneuvering, starting or lading of an airplane, video contents can be reproduced and watched by the respective passenger with the protective shutter being in its closed position.

According to the invention, a standardized electronic interface to the power supply of the media reproducing apparatus is provided.

The base holding fixture and/or the adapter may be pivotable such that the media reproducing apparatus, in the open position of the protective shutter, is adapted to be pivoted about a horizontal axis. A covering portion may prevent the media reproducing apparatus from being engaged from behind in its pivoted state such that a passenger cannot access any electronic interface of the media reproducing apparatus. Pivoting is effected at a first angle between 10 degrees and 30 degrees and preferably 20 degrees, for example, wherein a releasable latch is provided which prevents further pivoting beyond the first angle. The latch may be released to allow for pivoting beyond the first angle into a maintenance position of the media reproducing apparatus, for example. The second angle preferably lies in a range between 20 degrees and 90 degrees, and preferably approximately between 45 degrees and 90 degrees. The latch may be a portion of the cover of the backrest. For pivoting the media reproducing apparatus into the maintenance position the cover portion must be removed. Pivoting is preferably effected about a pivoting axis located above the media reproducing apparatus. When the screen of the media reproducing apparatus is located below the eye level of the respective passenger, the latter can pivot the media reproducing apparatus about the pivoting axis in an upward direction to adjust a suitable line of sight.

The protective shutter is preferably guided on opposite sides next to the base holding fixture and next to the adapter in respective rails fixedly connected with the seat. On the right-hand side and the left-hand side next to the base holding fixture and the adapter rails are provided which allow for reliably guiding the protective shutter and prevent the protective shutter from being engaged from behind. The rails form a safe termination between the protective shutter and the cover of the backrest.

Preferably, the protective shutter, in its open position, is displaced to a location between the cover of the backrest and the remaining portion of the backrest such that the protective shutter is at least largely covered by the backrest cover. When the protective shutter is closed, it is moved along the rails from behind the backrest cover into a position in front of the media reproducing apparatus. The protective shutter may be provided with a hand grip, and the backrest cover may comprise a grip recess in the form of a cavity in which the hand grip is exposed when the protective shutter is in its open position, while the protective shutter is essentially completely covered by the backrest cover.

Preferably, the protective shutter, in its closed position, is adapted to be locked. The locking mechanism may be adapted to be operated from a remote location by the cabin crew of a passenger plane, for example. Unlocking of the locking mechanism at the seat must not be allowed to prevent the passenger from unlocking said mechanism. It is advantageous when the locking mechanisms of the protective shutters of all passenger seats are adapted to be centrally operated from the remote location. During starting, during landing or prior to maneuvering a passenger plane the cabin crew can centrally operate the locking mechanisms for all passenger seats.

It is conceivable that the protective shutter is arranged above the media reproducing apparatus and, in the former's open position, held by another locking mechanism which is adapted to be operated by an electric contact. The electric contact can preferably also be centrally operated from the remote location. By operating the electric contact the locking mechanism is released and the protective shutter automatically moves downwards into the closed position. It is particularly advantageous when the electric contract automatically opens in its currentless state, thus releasing the protective shutter. In the case of a power failure the locking mechanism is thus automatically released and the protective shutter automatically moves downwards into the closed position.

Preferably, a visual indication is provided which indicates the locked state or at least the closed state of the protective shutter. The visual indication may be attached to the passenger seat, for example in the upper area of the backrest, such that it is visible to the cabin crew. Alternatively or additionally, a central visual indication for all or a plurality of the passenger seats may be provided at a remote location. The cabin crew are then able to centrally recognize the locking state of the seats at the remote location. It should also be recognizable which passenger seat has not yet been locked.

The adapter and/or the base holding fixture may be configured for clamping the media reproducing apparatus between the adapter and the base holding fixture. A plurality of adapters may be associated with a base holding fixture, said adapters each comprising a different holding fixture for receiving a different media reproducing apparatus. Thus a plurality of adapters may be provided from which one is selected for the media reproducing apparatus to be used.

The adapter and/or the base holding fixture may be provided with adjustable holding fixtures to allow for adapting the holding fixture to the media reproducing apparatus to be used. Adjustment may be realized by displacing clamping elements, for example.

Preferably, the adapters and the base holding fixtures are configured for receiving the media reproducing apparatus such that the media reproducing apparatus is held between the adapter and the base holding fixture and thus partially covered by the adapter. It is particularly advantageous when the outer edge of the media reproducing apparatus surrounding the screen of the media reproducing apparatus is covered such that only the screen is exposed. The adapter is thus provided with a cavity for the screen of the media reproducing apparatus.

The electric interface may be arranged at the adapter, wherein the adapter is not only adapted to a certain type of media reproducing apparatus with respect to the holding fixture but also with respect to the electric interface. At the base holding fixture or at the seat another interface may be provided which is electrically connected with a mains power supply, for example the on-board electrical system of the passenger plane. This further interface is adapted to be connected with the electric interface of the adapter. Alternatively, the electric interface for the media reproducing apparatus may be attached to the base holding fixture or to the passenger seat and may be electrically connected with the on-board electrical system.

Accordingly, an audio interface for connecting a head set with the media reproducing apparatus may be provided. The audio interface is adapted to be connected with an audio output of the media reproducing apparatus and should be freely accessible in the closed state of the protective shutter. The audio interface may be arranged at the backrest of the passenger seat, for example. Alternatively, the audio interface may be provided at the media reproducing apparatus.

The base holding fixture and the adapter are adapted to be placed in an immersed manner in a cavity of the backrest such that the base holding fixture, the adapter and a medium reproducing apparatus connected with the adapter do not project beyond the seat cover in the non-pivoted state of the media reproducing apparatus. The protective shutter should preferably be guided in the plane of the backrest cover such that in the closed state of the protective shutter a plane continuous surface for protecting the passenger is formed.

The adapter is preferably provided with a grip recess for gripping and pulling or pivoting the adapter out of the plane of the seat cover. The grip recess should be provided at the lower edge of the adapter when the pivoting axis is located above the media reproducing apparatus.

The protective shutter is preferably configured as an integral disk from a translucent, largely break-proof plastic material, for example polycarbonate. The outside of the protective shutter opposite the adapter and the base holding fixture should be flat and plane to minimize the risk of injury.

BRIEF DESCRIPTION OF THE DRAWINGS

Hereunder an exemplary embodiment of the invention is described in detail with reference to the figures in which:

FIG. 1 shows an explosion view of the exemplary embodiment,

FIG. 2 shows a perspective view of the exemplary embodiment,

DETAILED DESCRIPTION OF THE INVENTION

Figure 3:
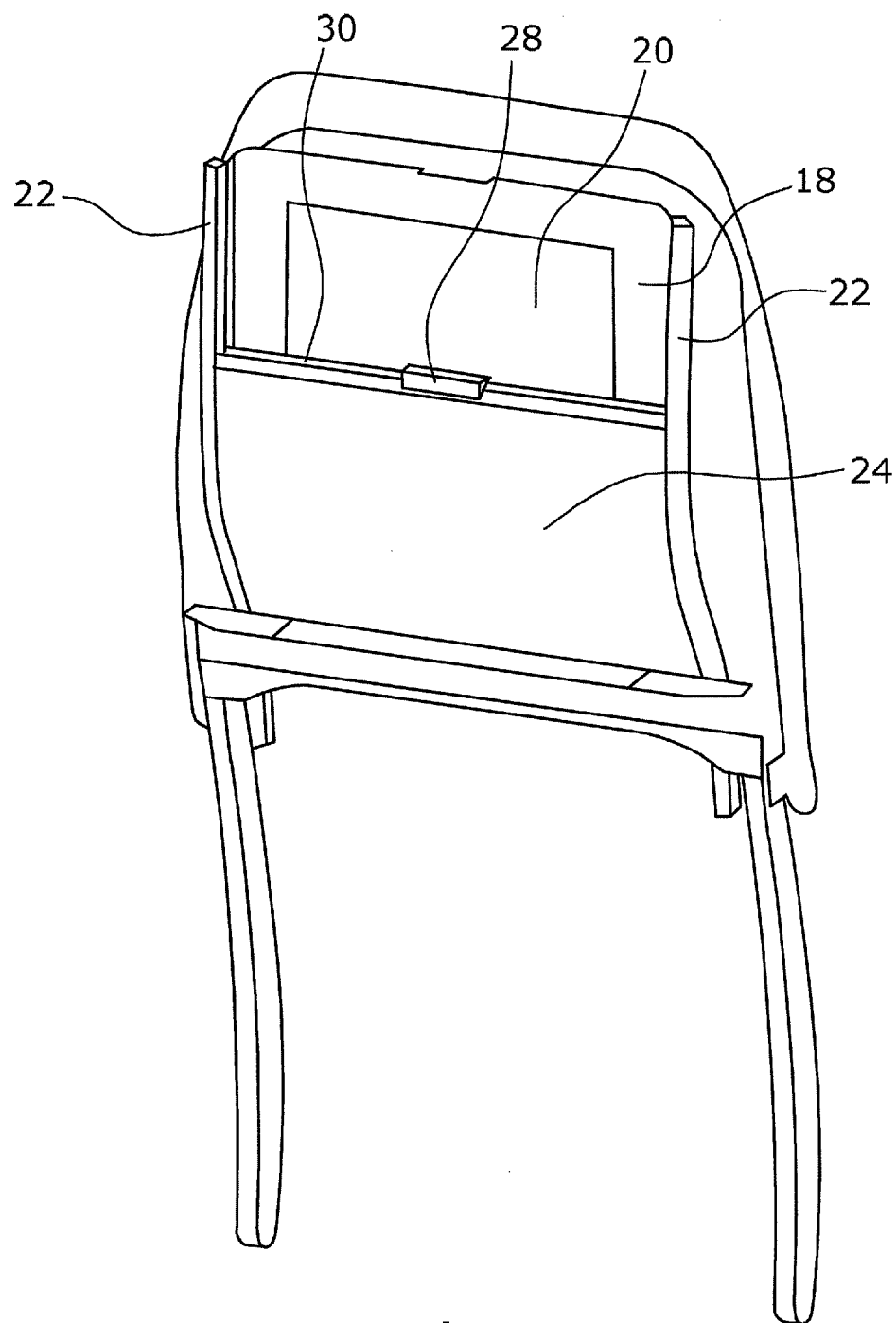
FIG. 3 shows the holding fixture of the exemplary embodiment.
Figure 4:
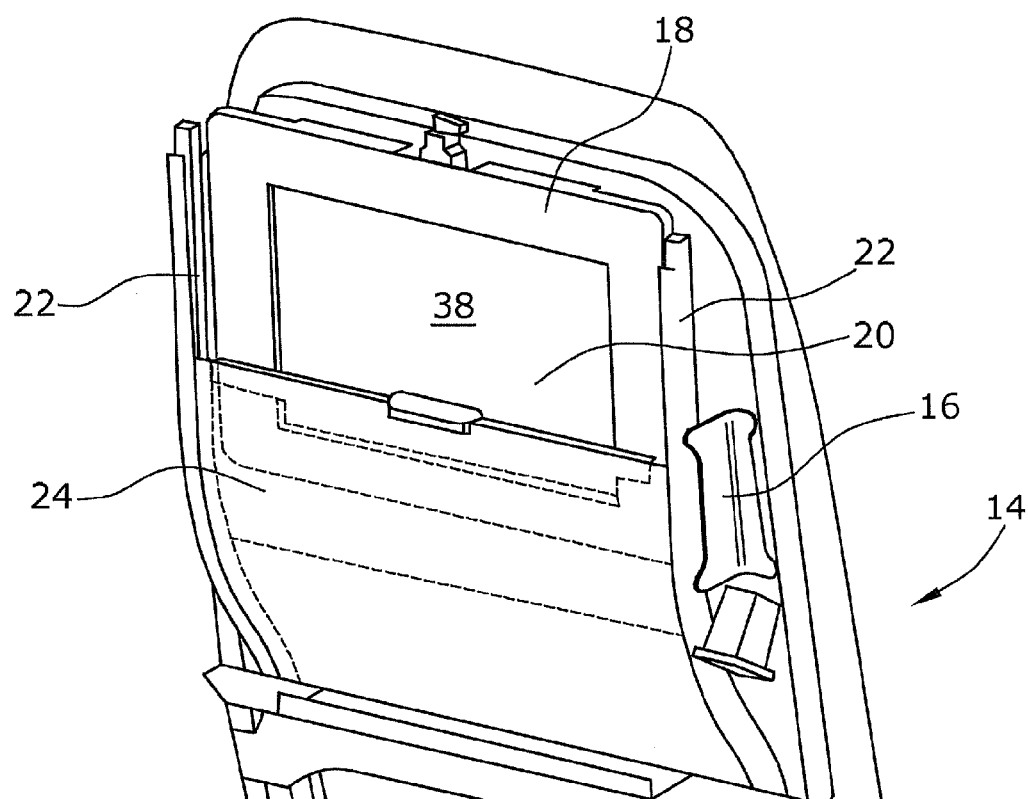
FIG. 4 shows a detailed view of the representation of FIG. 3.

In a cavity 12 of a backrest 14 of a passenger seat a base holding fixture 16 is fixedly screwed. The base holding fixture 16 is a metal plate provided with standardized openings which are in register with corresponding threaded receptacles in the backrest 14 to screw the base holding fixture 16 to the backrest.

An adapter 18 is adapted to be connected with the base holding fixture 16 by means of standardized fasteners. The adapter 18 is configured for receiving a media reproducing apparatus 20 in the form of a tablet PC.

Figure 5:
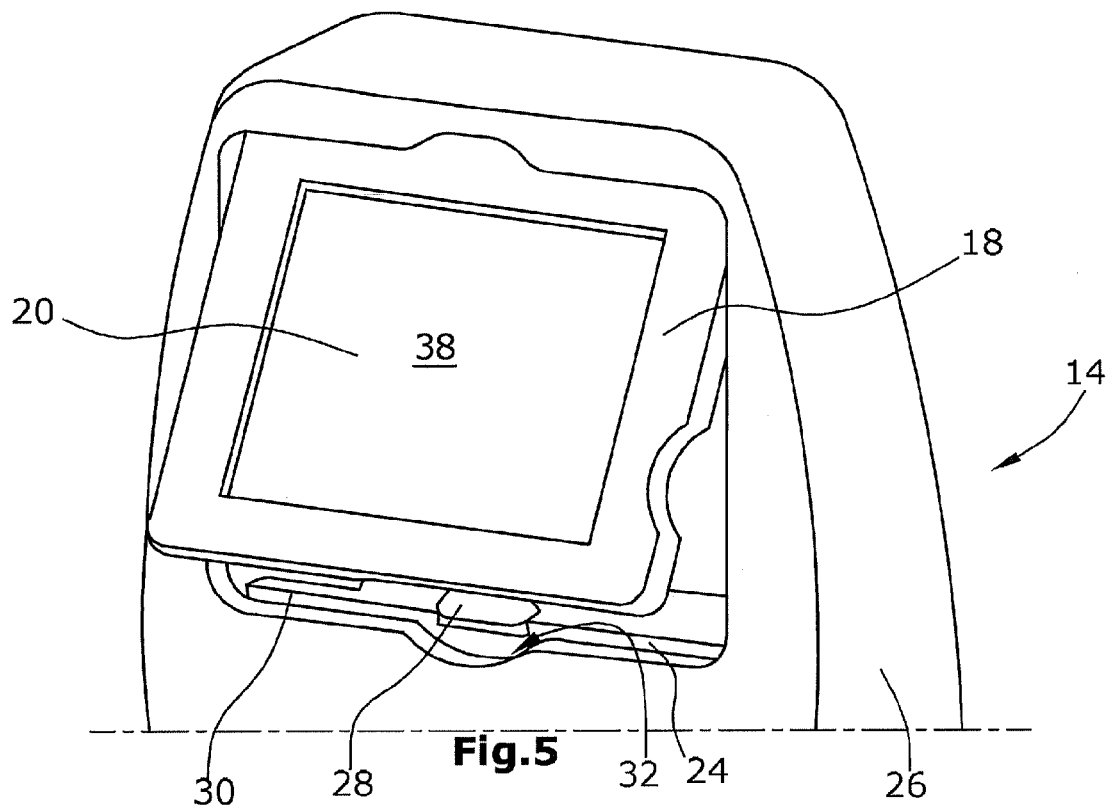
FIG. 5 shows another detailed view.

Laterally next to the adapter 18 and next to the media reproducing apparatus 20 rails 22 for displaceably guiding a protective shutter 24 are arranged on opposite sides. As seen from the passenger's viewing direction to the media reproducing apparatus 20 one rail is arranged on the right-hand side next to the media reproducing apparatus 20 and the other one is arranged on the left-hand side next to the media reproducing apparatus 20. The rails 22 are fixedly screwed to the base holding fixture 16 and to the backrest 14 of the passenger seat. The rails 22 are guided at their lower ends in a slightly curved S-form to a location between the cover 26 of the backrest and the backrest 14. Thus the protective shutter 24, in its open position illustrated in FIG. 5, is moved to a location between the cover 26 and the backrest 14 and is then covered by the backrest cover 26. Merely the hand grip 28 and an upper end strip 30 connecting the hand grip 28 with the protective shutter 24 are exposed.

The hand grip 28 is arranged in a grip recess 31 configured as a cavity 12 of the cover 26. Thus the hand grip 28 can be gripped to displace the protective shutter 24 in the rails 22 in upward direction into the closed position in which the protective shutter 24 completely covers the media reproducing apparatus 20 and the adapter 18. The rails 22 and the protective cover 24 thus form a completely closed covering such that it is not possible to access the media reproducing apparatus 20 in the closed position of the protective shutter 24.

The protective shutter is a flexible translucent disk of a break-proof plastic material. Thus, in the closed position the protective shutter 24, videos played on the media reproducing apparatus 20 can be watched.

In the closed position of the protective shutter 24 the latter is adapted to be locked. The locking mechanism is not shown in the figures. The locking mechanism can be electrically operated, namely centrally for the protective shutters 24 of all passenger seats from a remote location where the cabin crew can operate the locking mechanism.

In another exemplary embodiment not shown in the figures the protective shutter 24 is adapted to be displaced from the closed position into an open position above the media reproducing apparatus 20 and the adapter 18 and is adapted to be locked in this position. Said locking is effected with the aid of a micro switch which in its currentless state releases the locking mechanism. The cabin crew can centrally release the locking mechanisms for all sliding shutters 24 in the open position of the protective shutters 24 such that the protective shutters move downwards into the closed position. Further, in the open position the locking mechanism is automatically opened in the case of a power failure, and the protective shutters 24 move downwards.

The base holding fixture 16 is of bipartite configuration. The first portion of the base holding fixture 16 in the form of a metal plate is fixedly screwed to the backrest 14 of the passenger seat. The second portion 32 is pivotably held at the first portion via pivoting hinges 34. The adapter 18 is configured as a covering frame to fasten the medium reproducing apparatus 20 to the second portion 32 of the base holding fixture 16. Fastening is effected with the aid of two screws 36.

Thus the adapter 18 in a way forms a covering frame which leaves the screen 38 of the media reproducing apparatus 20 exposed and covers the housing of the media reproducing apparatus 20 surrounding the screen 38. Hence access to the screen 38, which typically is a touch screen, is possible in the open position of the protective shutter 24 to allow for operation of the media reproducing apparatus 20. In the closed position of the protective shutter 24 the screen 38 can be seen but not operated through the protective shutter 24.

An aspect of the invention is related to the idea of fastening various types of media reproducing apparatus 20, such as tablet PCs or smart phones having correspondingly adapted or adaptable adapters 18, to a standardized base holding fixture 16, wherein the protective shutter 24 allows for complete covering and protecting of the media reproducing apparatus 20 while video contents, which are reproduced on the media reproducing apparatus 20 in the closed position of the protective shutter 24, can be watched through the translucent protective shutter 24. In other words, various types of media reproducing apparatus which are actually not allowed for use as seat screens in an aircraft, for example, can be protected with the aid of the protective shutter 24 to meet the corresponding safety requirements during maneuvering, starting and landing of the aircraft, while a reproduction on the media reproducing apparatus 20 is allowed for by the translucent protective shutter 24.

Aspects of the invention may be:

1. A passenger seat including a holding device for a media reproducing apparatus (20), comprising
    a base holding fixture (16) attached to a backrest (14) of said passenger seat,
    at least one adapter (18) adapted to be detachably connected with said base holding fixture (16), said adapter being configured for holding said media reproducing apparatus (20) at said base holding fixture (16),
    a standardized electronic interface to the power supply of said media reproducing apparatus (20), and
    a protective shutter (24) fixedly connected with said backrest (14), said protective shutter being adapted to be moved from an open position in which access to said adapter (18) and said media reproducing apparatus (20) is allowed, into a closed position in which said media reproducing apparatus (20) and said adapter (18) are completely covered by said protective shutter (24), wherein said protective shutter (24) is of break-proof configuration and made at least partially from a translucent material such that a screen (38) is visible through said protective shutter (24) in the closed position of the latter.
2. The passenger seat according to 1., wherein the base holding fixture (16) and/or the adapter (18) are pivotably arranged such that the media reproducing apparatus (20) held at said adapter (18) is adapted to be pivoted about a horizontal axis in the open position of the protective shutter (24).
3. The passenger seat according to 2., wherein a covering portion between the backrest (14) and the adapter (18) prevents the media reproducing apparatus (20) from being engaged from behind in the pivoted state.
4. The passenger seat according to 2. or 3., wherein the base holding fixture (16) and/or the adapter (18) are adapted to be pivoted at a first angle, wherein a releasable latch which prevents further pivoting beyond said first angle is provided and wherein, when said latch is released, pivoting of the media reproducing apparatus (20) beyond said first angle into a maintenance position is allowed.

5. The passenger seat according to 4., wherein the latch is an element of the seat cover.
6. The passenger seat according to 4. or 5., wherein the first angle lies in the range between 10 degrees and 30 degrees and is preferably approximately 20 degrees.
7. The passenger seat according to any one of the aspects 4.-6., wherein the second angle lies in a range between 20 degrees and 90 degrees and preferably in a range between 45 degrees and 90 degrees.
8. The passenger seat according to any one of the aspects 2.-7., wherein the pivoting axis is located above the media reproducing apparatus (20).
9. The passenger seat according to any one of the preceding aspects wherein the protective shutter (24) is laterally guided in rails (22) respectively arranged on opposite sides of the base holding fixture (16) and the adapter (18) and connected with the backrest (14) of the seat.
10. The passenger seat according to any one of the preceding aspects, wherein the backrest (14) comprises a cover (26), wherein the protective shutter (24), in its open position, is displaced to a location between said cover (26) and said backrest (14) such that said protective shutter (24) is essentially covered by said backrest cover (26).
11. The passenger seat according to any one of the preceding aspects, wherein the protective shutter (24) is adapted to be locked in its closed position.
12. The passenger seat according to 11., wherein the locking mechanism of the protective shutters of a plurality of passenger seats is configured such that it is a adapted to be centrally operated at a remote location.
13. The passenger seat according to 11. or 12., wherein a visual indication is provided which indicates the locked or closed state of the protective shutter (24).
14. The passenger seat according to 13., wherein the visual indication is attached to said passenger seat.
15. The passenger seat according to aspect 13. or 14., wherein a visual indication for the protective shutters of a plurality of passenger seats is centrally provided at a remote location.
16. The passenger seat according to any one of the preceding aspects, wherein the protective shutter (24), in its open position, is arranged above the adapter (18) and is provided with a locking mechanism adapted to be operated by an electric contact, said locking mechanism, in the currentless state, being automatically opened thus releasing said protective shutter (24).
17. The passenger seat according to any one of the preceding aspects, wherein the adapter (18) and/or the base holding fixture (16) are configured for clamping the media reproducing apparatus (20) between said adapter (18) and said base holding fixture (16).
18. The passenger seat according to any one of the preceding aspects, wherein a plurality of adapters (18) associated with the base holding fixture (16) are provided, said adapters each comprising a different holding fixture for receiving a different media reproducing apparatus (20).
19. The passenger seat according to any one of the preceding aspects, wherein the adapter (18) and/or the base holding fixture (16) are provided with an adjustable holding fixture for the media reproducing apparatus (20) adaptable to different media reproducing apparatus (20).
20. The passenger seat according to any one of the preceding aspects, wherein the adapter (18) and the base holding fixture (16) are configured for receiving the media reproducing apparatus (20) between said adapter (18) and said base holding fixture (16) such that said media reproducing apparatus (20) is partially covered by said adapter (18).
21. The passenger seat according to any one of the preceding aspects, wherein the electric interface is arranged at the adapter (18).
22. The passenger seat according to 21., wherein the electric interface is adapted to be connected with another interface electrically connected with a voltage supply system at the base holding fixture (16) or said passenger seat.
23. The passenger seat according to any one of the preceding aspects, wherein the electric interface is arranged at the base holding fixture (16) and electrically connected with a voltage supply system.
24. The passenger seat according to any one of the preceding aspects, wherein the protective shutter (24) is made of a plastic material, for example of polycarbonate or a thermosetting material.
25. The passenger seat according to any one of the preceding aspects, wherein the adapter (18) or the backrest (14) of said passenger seat comprises an audio interface adapted to be connected with an audio signal output of the media reproducing apparatus (20) for connecting a head set, said audio interface being exposed in the closed position of the protective shutter (24).
26. The passenger seat according to any one of the preceding aspects, wherein the base holding fixture (16) and the adapter (18) are immersed in a cavity (12) provided in a rear side of the backrest (14) of said passenger seat such that said base holding fixture (16), said adapter (18) and the media reproducing apparatus (20) do not project beyond the outer periphery of said backrest (14).
27. The passenger seat according to any one of the preceding aspects, wherein the adapter (18) is provided with a grip recess (31) for gripping and pulling or pivoting said adapter (18) out of the backrest (14).

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:
1. A passenger seat including a holding device for a media reproducing apparatus, comprising:
   a base holding fixture attached to a backrest of said passenger seat;
   at least one adapter adapted to be detachably connected with said base holding fixture, said adapter being configured for holding said media reproducing apparatus at said base holding fixture;
   a standardized electronic interface for a power supply of said media reproducing apparatus; and
   a protective shutter fixedly connected with said backrest, said protective shutter being adapted to be moved from an open position in which access to said adapter and said media reproducing apparatus is allowed, into a closed position in which said media reproducing apparatus and said adapter are completely covered by said protective shutter, wherein said protective shutter is of a break-proof configuration and made at least partially from a translucent material such that a screen is visible through said protective shutter in the closed position of the latter.
2. The passenger seat according to claim 1, wherein one or more of the base holding fixture and the adapter are pivotably arranged such that the media reproducing apparatus held at said adapter is adapted to be pivoted about a horizontal axis in the open position of the protective shutter.

3. The passenger seat according to claim 2, wherein a covering portion between the backrest and the adapter prevents the media reproducing apparatus from being engaged from behind in a pivoted state.

4. The passenger seat according to claim 2, wherein one or more of the base holding fixture and the adapter are adapted to be pivoted at a first angle, wherein a releasable latch which prevents further pivoting beyond said first angle is provided and wherein, when said latch is released, pivoting of the media reproducing apparatus beyond said first angle into a maintenance position is allowed.

5. The passenger seat according to claim 1, wherein the protective shutter is laterally guided in rails respectively arranged on opposite sides of the base holding fixture and the adapter and connected with the backrest of the seat.

6. The passenger seat according to claim 1, wherein the backrest comprises a cover, wherein the protective shutter, in its open position, is displaced to a location between said cover and said backrest such that said protective shutter is essentially covered by said backrest cover.

7. The passenger seat according to claim 1, wherein the protective shutter is adapted to be locked in its closed position, wherein a locking mechanism of each of the protective shutters of a plurality of passenger seats is configured such that it is adapted to be centrally operated at a remote location.

8. The passenger seat according to claim 7, wherein a visual indication is provided which indicates a locked or closed state of the protective shutter.

9. The passenger seat according to claim 1, wherein the protective shutter, in its open position, is arranged above the adapter and is provided with a locking mechanism adapted to be operated by an electric contact, said locking mechanism, in a currentless state, being automatically opened thus releasing said protective shutter.

10. The passenger seat according to claim 1, wherein one or more of the adapter and the base holding fixture are configured for clamping the media reproducing apparatus between said adapter and said base holding fixture.

11. The passenger seat according to claim 1, wherein a plurality of adapters associated with the base holding fixture are provided, said adapters each comprising a different holding fixture for receiving a different media reproducing apparatus.

12. The passenger seat according to claim 1, wherein one or more of the adapter and the base holding fixture are provided with an adjustable holding fixture for the media reproducing apparatus adaptable to different media reproducing apparatus.

13. The passenger seat according to claim 1, wherein the electric interface is arranged at the adapter and is adapted to be connected with another interface electrically connected with a voltage supply system at the base holding fixture or said passenger seat.

14. The passenger seat according to claim 1, wherein the adapter or the backrest of said passenger seat comprises an audio interface adapted to be connected with an audio signal output of the media reproducing apparatus for connecting a head set, said audio interface being exposed in the closed position of the protective shutter.

15. The passenger seat according to claim 1, wherein the base holding fixture and the adapter are immersed in a cavity provided in a rear side of the backrest of said passenger seat such that said base holding fixture, said adapter and the media reproducing apparatus do not project beyond an outer periphery of said backrest.

\* \* \* \* \*